US011849159B2

United States Patent
Koike et al.

(10) Patent No.: US 11,849,159 B2
(45) Date of Patent: Dec. 19, 2023

(54) VIDEO DISTRIBUTION APPARATUS, VIDEO DISTRIBUTION METHOD AND PROGRAM

(71) Applicant: Nippon Telegraph and Telephone Corporation, Tokyo (JP)

(72) Inventors: Masanori Koike, Musashino (JP); Yuichiro Urata, Musashino (JP); Kazuhisa Yamagishi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 57 days.

(21) Appl. No.: 17/605,166

(22) PCT Filed: May 22, 2019

(86) PCT No.: PCT/JP2019/020221
§ 371 (c)(1),
(2) Date: Oct. 20, 2021

(87) PCT Pub. No.: WO2020/235034
PCT Pub. Date: Nov. 26, 2020

(65) Prior Publication Data
US 2022/0232263 A1    Jul. 21, 2022

(51) Int. Cl.
*H04N 21/2343* (2011.01)
*H04N 21/81* (2011.01)

(52) U.S. Cl.
CPC ....... *H04N 21/2343* (2013.01); *H04N 21/816* (2013.01)

(58) Field of Classification Search
CPC .......................... H04N 21/2343; H04N 21/816
See application file for complete search history.

(56) References Cited

U.S. PATENT DOCUMENTS

2019/0356894 A1* 11/2019 Oh ................. H04N 21/234345
2020/0177927 A1*  6/2020 Yang ................. H04N 21/6587

FOREIGN PATENT DOCUMENTS

JP    2013183209    9/2013
JP    2015097343    5/2015

OTHER PUBLICATIONS

Ban et al., "An optimal spatial-temporal smoothness approach for tile-based 360-degree video streaming," IEEE Visual Communications and Image Processing, Dec. 10, 2017, pp. 1-4.

(Continued)

*Primary Examiner* — Yassin Alata
(74) *Attorney, Agent, or Firm* — Fish & Richardson P.C.

(57) ABSTRACT

A video streaming device that divides a video in which a plurality of viewing directions are defined into divided data pieces and distributes each of the divided data pieces in a chronological order. The video streaming device includes: a prediction unit that refers to information indicating the viewing direction of a viewer for each of the divided data pieces with respect to multiple views of the video in the past, and predicts, for a terminal playing the video, the viewing direction of a user of the terminal in a first divided data piece that is undistributed; and a streaming unit that distributes the first divided data piece to the terminal by setting an area corresponding to the viewing direction predicted by the prediction unit to be in a relatively high image quality among selectable image qualities. Thereby, probability of viewing the video of a low image quality is decreased.

4 Claims, 10 Drawing Sheets

(56) References Cited

OTHER PUBLICATIONS

Le Feuvre et al., "Tiled-based Adaptive Streaming using MPEG-DASH," MMSys '16 Proceedings of the 7th International Conference on Multimedia Systems, May 10, 2016, 3 pages.
Sodagar, "The MPEG-DASH Standard for Multimedia Streaming Over the Internet," IEEE Multimedia, 2011, 18(4):62-67.

* cited by examiner

Fig. 6

| | | \.\.\. | t−1 | t | t+1 | \.\.\. |
|---|---|---|---|---|---|---|
| | | | CHUNK NUMBER | | | |
| TILE | A | \.\.\. | 40 | 30 | 20 | \.\.\. |
| | B | \.\.\. | 30 | 40 | 25 | \.\.\. |
| | C | \.\.\. | 20 | 20 | 35 | \.\.\. |
| | D | \.\.\. | 10 | 10 | 20 | \.\.\. |

Fig. 8

| | | CHUNK t+1+N | | | |
|---|---|---|---|---|---|
| | | CHUNK NUMBER t+N | | | |
| | | A | B | C | D |
| NUMBER t | A | 10 | 5 | 15 | 5 |
| | B | 5 | 15 | 5 | 10 |
| | C | 5 | 0 | 10 | 0 |
| | D | 0 | 5 | 0 | 5 |

VIDEO DISTRIBUTION APPARATUS, VIDEO DISTRIBUTION METHOD AND PROGRAM

CROSS-REFERENCE TO RELATED APPLICATIONS

This application is a National Stage application under 35 U.S.C. § 371 of International Application No. PCT/JP2019/020221, having an International Filing Date of May 22, 2019. The disclosure of the prior application is considered part of the disclosure of this application, and is incorporated in its entirety into this application.

TECHNICAL FIELD

The present invention relates to a video streaming device, a video streaming method, and a program.

BACKGROUND ART

Recently, due to development in virtual reality (VR) technology, there have been increasing opportunities for viewing VR videos with which users can see 360-degree views. Accordingly, VR video streaming services have been increased, and there have also been increasing opportunities for users to view VR videos by using head mount displays (HMD), stationary displays, or the like.

When a user views a VR video, the user may wear an HMD and can change the line-of-sight direction by taking an action such as shaking their head or moving their body, for example. Further, it is also possible to change the viewing direction of the video by operating a conventional stationary display with a mouse or the like. That is, in VR video streaming, the video displayed in the HMD or the like is only a partial area of the entire 360-degree video.

Therefore, unlike a method like a conventional video streaming service that distributes the whole video with a uniform image quality, there has been proposed a method called tile-based streaming that distributes a video in a viewing direction of the user displayed on an HMD or the like with a high image quality, but does not distribute, or distributes with a low image quality, the other video that is not displayed in the HMD or the like so as to suppress the streaming cost. Specifically, proposed is a method that uses a streaming method called MPEG-DASH disclosed in Non-Patent Literature 1, and distributes a VR video by changing the image quality for each tile by performing tile division of the VR video as disclosed in Non-Patent Literature 2 and Non-Patent Literature 3.

CITATION LIST

Non-Patent Literature

Non-Patent Literature 1: I. Sodagar, "The MPEG-DASH Standard for Multimedia Streaming Over the Internet," in IEEE MultiMedia, vol. 18, pp. 62-67, 2011.
Non-Patent Literature 2: Jean Le Feuvre, Cyril Concolato, "Tiled-based Adaptive Streaming using MPEG-DASH," MMSys '16 Proceedings of the 7th International Conference on Multimedia Systems, Article No. 41
Non-Patent Literature 3: Y. Ban, L. Xie, Z. Xu, X. Zhang, Z. Guo and Y. Hu, "An optimal spatial-temporal smoothness approach for tile-based 360-degree video streaming," 2017 IEEE Visual Communications and Image Processing (VCIP), St. Petersburg, F L, 2017, pp. 1-4.

SUMMARY OF THE INVENTION

Technical Problem

However, with the tile-based streaming that distributes the tiles of the video only in the viewing direction of the user displayed in the HMD or the like with a high image quality and distributes the tiles of the other parts with a low image quality, if the viewing direction changes by the user's action such as shaking their head, the user comes to view the tile of a low image quality until the video of a high image quality is distributed from the server after the client terminal requests the tile of the video of a high image quality in a new viewing direction. Therefore, the user comes to perceive deterioration of the image quality.

The present invention is designed in view of the foregoing circumstances, and an object thereof is to decrease the probability of viewing the video of a low quality.

Means for Solving the Problem

In order to overcome the aforementioned problem, the video streaming device is a video streaming device dividing a video in which a plurality of viewing directions are defined into a plurality of divided data pieces and distributing each of the divided data pieces in a chronological order, and the video streaming device includes: a prediction unit that refers to information indicating the viewing direction of a viewer for each of the divided data pieces with respect to a plurality of views of the video in the past, and predicts, for a terminal playing the video, the viewing direction of a user of the terminal in a first divided data piece that is undistributed; and a streaming unit that distributes the first divided data piece to the terminal by setting an area corresponding to the viewing direction predicted by the prediction unit to be in a relatively high image quality among selectable image qualities.

Effects of the Invention

It is possible to decrease the probability of viewing the video of a low image quality.

BRIEF DESCRIPTION OF DRAWINGS

FIG. 6 is a chart illustrating an example of a process result of a viewing-direction information group according to the first embodiment.
FIG. 8 is a chart illustrating an example of a process result of a viewing-direction information group according to a second embodiment.

DESCRIPTION OF EMBODIMENTS

Figure 1:
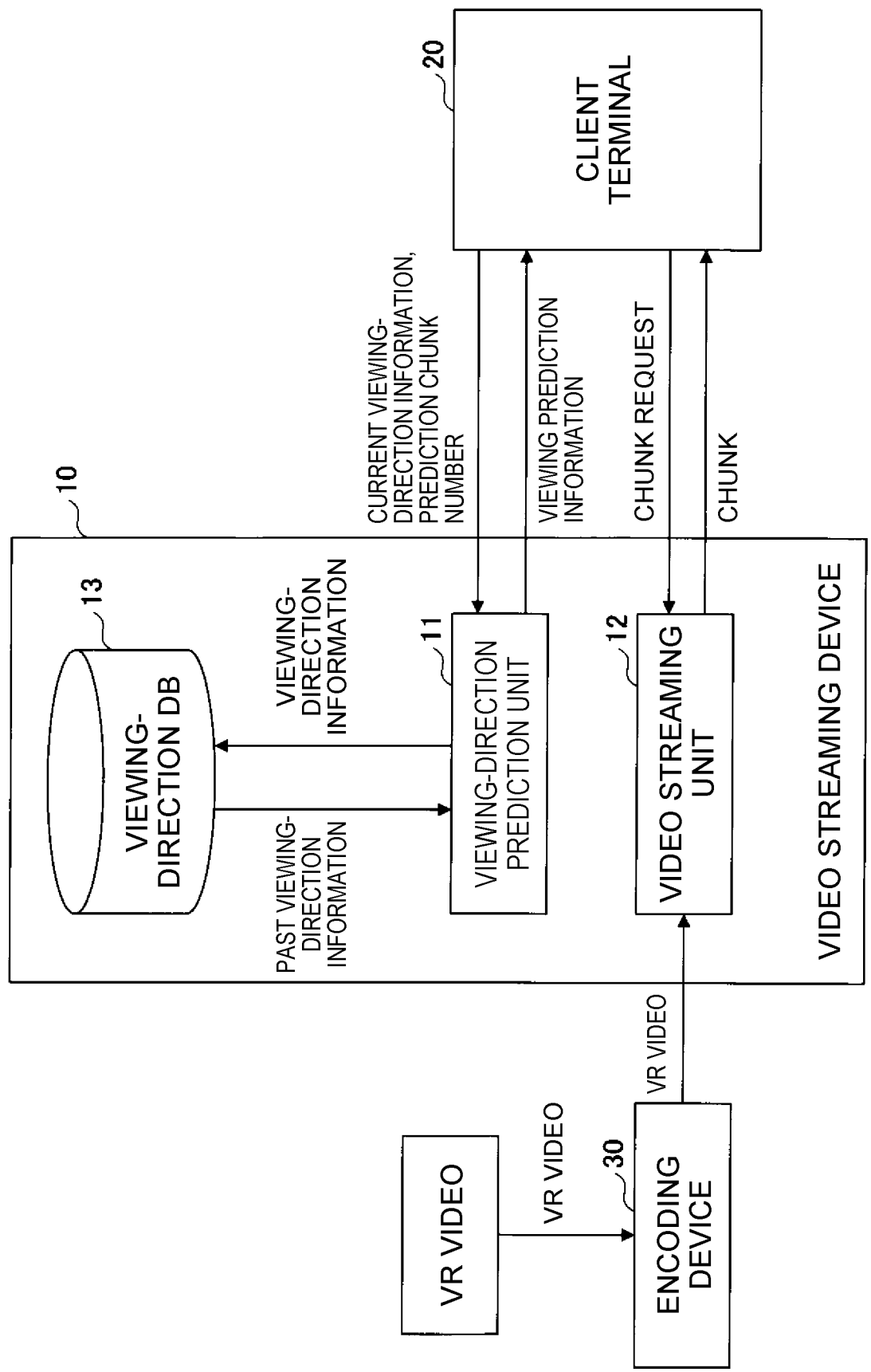
FIG. 1 is a diagram illustrating an example of a system configuration according to a first embodiment.

Hereinafter, a first embodiment will be described with reference to the accompanying drawings. FIG. 1 is a diagram illustrating an example of a system configuration according to the first embodiment. In FIG. 1, a video streaming device 10 is capable of performing communication with an encoding device 30 and a client terminal 20 via a network.

The encoding device 30 divides a virtual reality video (VR video) into a plurality of areas in a tile-like form, and performs encoding on each of the tile areas. As a result, a video in which a plurality of tiles (viewing directions) are defined is generated.

Figure 2:
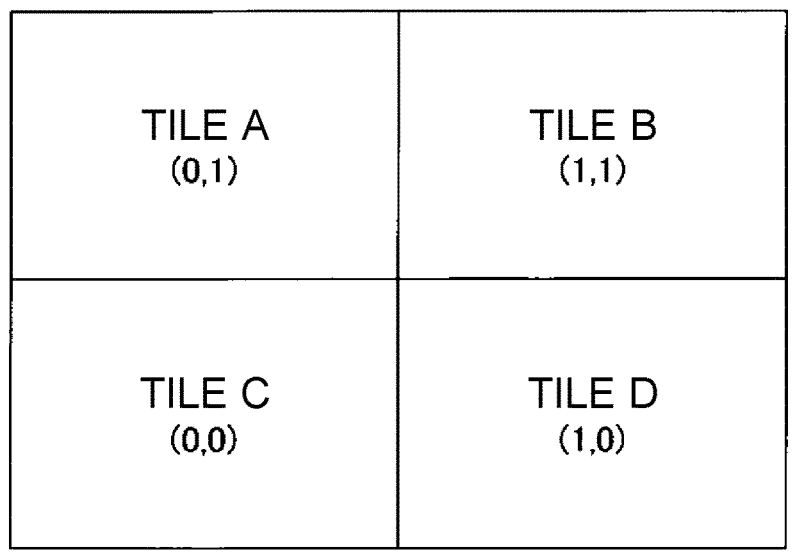
FIG. 2 is a diagram illustrating an example for dividing a VR video into tiles.

FIG. 2 is a diagram illustrating an example for dividing a VR video into tiles. Illustrated is a case where the VR video is separated into four tiles from tile A to tile D. Although the VR video can be divided into an arbitrary number of tiles, described hereinafter is a case of dividing it into four tiles as in FIG. 2 for simplifying the explanation. Further, in the embodiment, the coordinates of the tiles are defined such that the tile at the lower left thereof is (0, 0).

When encoding, the encoding device 30 performs encoding such that each of the tiles of the VR video has a plurality of image qualities. At this time, each of the tiles is sectioned by each specific time (about 0.5 to 10 seconds) and put into a file. Each of such files is called a chunk. That is, the chunks are files (data) acquired by dividing the VR video into a plurality of pieces in a time direction. The generated chunks are transmitted to the video streaming device 10. The video streaming device 10 stores the received chunks. In the embodiment, numbers are allocated to the sectioned chunks in a chronological order from the beginning of the video to be the chunk numbers. For example, assuming that the time for chunking is 2 seconds, the chunk numbers are set to each of the chunks such that the chunk number of the video of the chunk from 0 to 2 seconds is "1", the chunk number of the video of 2 to 4 seconds is "2", and so on.

In FIG. 1, the video streaming device 10 includes a viewing-direction prediction unit 11 and a video streaming unit 12. The video streaming device 10 also uses a viewing-direction DB 13.

The viewing-direction prediction unit 11 receives, from the client terminal 20, information (referred to as "viewing-direction information" hereinafter) including the user ID, information for identifying the currently-viewed VR video (referred to as "video ID" hereinafter), currently viewing direction (identification information of the viewed tile (referred to as "tile ID" hereinafter)), the currently playing (viewing) chunk number (chunk number on the video medium), and the like as well as the chunk number to be predicted (referred to as "prediction chunk number" hereinafter), and records the received viewing-direction information in the viewing-direction DB 13. That is, the viewing-direction information and the like are received by each of the chunks. Note that the user ID may be the identification information of the user or may be the identification information of the client terminal 20. In the viewing-direction DB 13, histories of the viewing-direction information received by the viewing-direction prediction unit 11 from each of the client terminals 20 of a plurality of users are stored.

The viewing-direction prediction unit 11 also predicts the viewing direction for the chunk related to the prediction chunk number based on the information stored in the viewing-direction DB 13, and transmits viewing prediction information indicating the viewing direction as a prediction result to the client terminal 20. In the embodiment, the viewing direction is distinguished by a tile unit. Therefore, the value of the viewing prediction information is the tile ID. Further, as the prediction chunk number, the chunk number of an undistributed chunk is designated to the client terminal 20.

The video streaming unit 12 performs tile-based streaming for the chunk requested by the client terminal 20. The chunks demanded in the requests from the client terminal 20 are in a chronological order. Therefore, the video streaming unit 12 distributes each of the chunks to the client terminal 20 in the chronological order.

The client terminal 20 is a terminal used for viewing the VR video. The client terminal 20 transmits the current viewing-direction information and the prediction chunk number to the viewing-direction prediction unit 11 of the video streaming device 10, and receives the viewing prediction information for the chunk related to the prediction chunk number from the viewing-direction prediction unit 11. As the prediction chunk number, it is also possible to designate the number of a next chunk that is after the chunk held in a buffer of the client terminal 20. With respect to the chunk related to the prediction chunk number, the client terminal 20 requests the video streaming unit 12 a video of a high image quality for the tile related to the currently viewing direction and the viewing prediction information and a video of a low image quality for the other tiles and downloads the video (chunk) according to the request for each of the tiles to play the video sequentially. Note that the video of a high image quality means a video of a relatively high image quality among the video of a plurality of selectable image qualities (a plurality of image qualities encoded by the encoding device 30). The video of a low image quality means a video of a relatively low image quality among the video of a plurality of selectable image qualities (a plurality of image qualities encoded by the encoding device 30).

Figure 3:
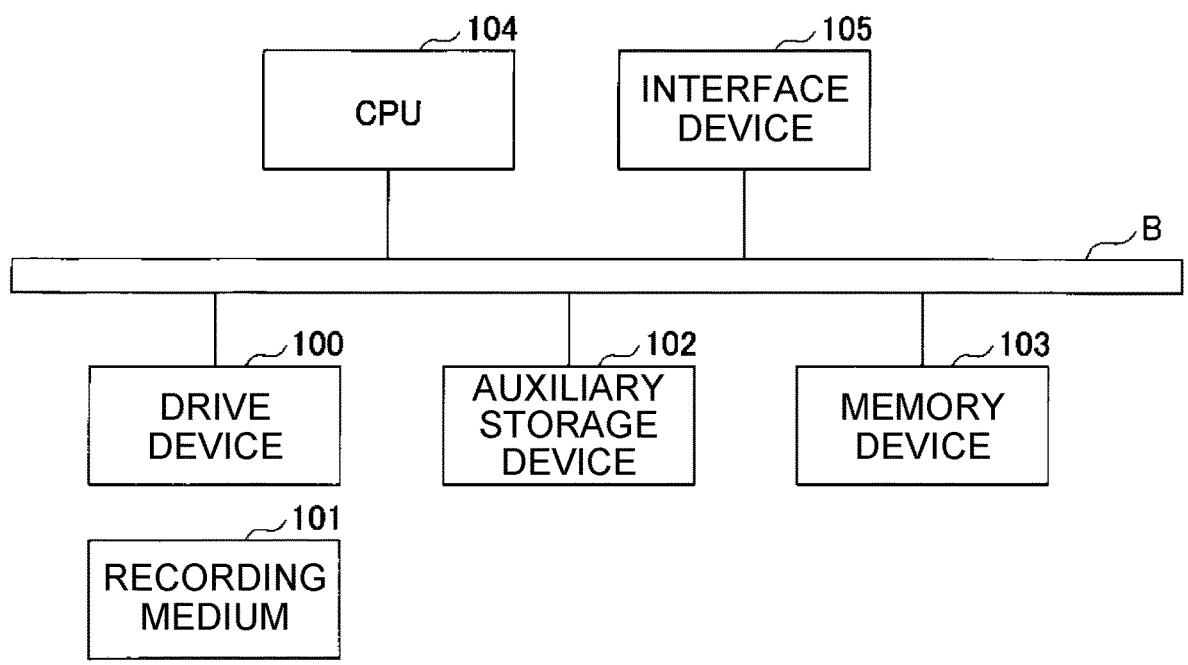
FIG. 3 is a diagram illustrating an example of a hardware configuration of a video streaming device 10 according to the first embodiment.

FIG. 3 is a diagram illustrating an example of a hardware configuration of the video streaming device 10 according to the first embodiment. The video streaming device 10 of FIG. 3 includes a drive device 100, an auxiliary storage device 102, a memory device 103, a CPU 104, an interface device 105, and the like connected mutually via a bus B.

A program implementing the processing of the video streaming device 10 is provided by a recording medium 101 such as a CD-ROM. When the recording medium 101 to which the program is recorded is set to the drive device 100, the program is installed to the auxiliary storage device 102 from the recording medium 101 via the drive device 100. Note, however, that the program may not necessarily need to be installed from the recording medium 101 but may be downloaded from another computer via a network. The auxiliary storage device 102 stores the installed program and also stores necessary files, data, and the like.

The memory device 103 reads out and stores the program from the auxiliary storage device 102 when there is a start instruction of the program. The CPU 104 executes functions related to the video streaming device 10 according to the program stored in the memory device 103. The interface device 105 is used as an interface for connecting to the network.

Note that the viewing-direction prediction unit 11 and the video streaming unit 12 in FIG. 1 are implemented by the processing executed by the CPU 104 by one or more programs installed in the video streaming device 10. Further, the viewing-direction DB 13 can be implemented by using a storage device or the like that can be connected to the auxiliary storage device 102 or the video streaming device 10, for example, via the network.

Figure 4:
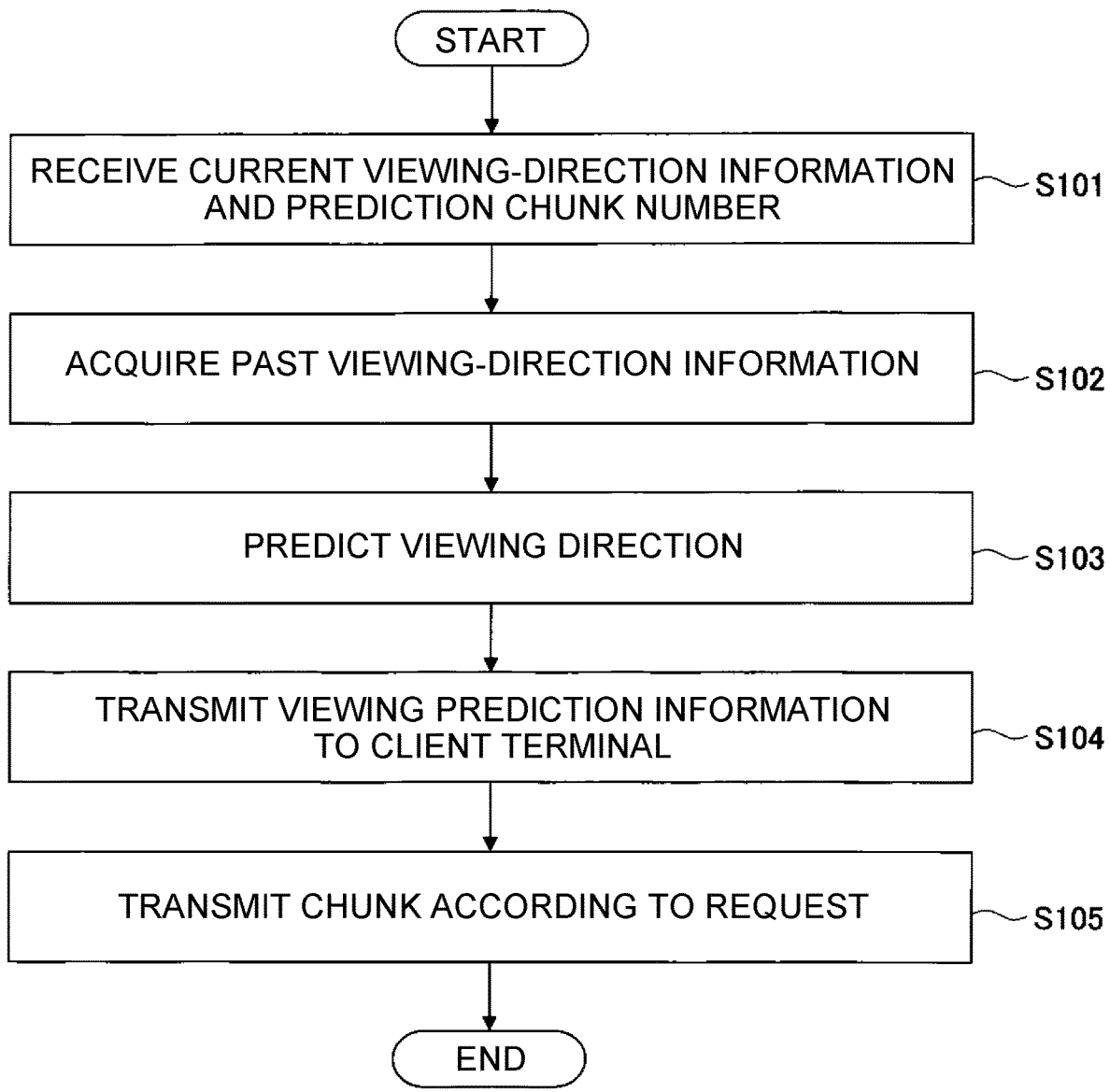
FIG. 4 is a flowchart for describing an example of a processing procedure executed by the video streaming device 10.

Hereinafter, the processing procedure executed by the video streaming device 10 will be described. FIG. 4 is a flowchart for describing an example of the processing procedure executed by the video streaming device 10.

Upon receiving the current viewing-direction information including the user ID (referred to as "target user ID" hereinafter), a video ID (referred to as "target video ID" hereinafter) of the VR video currently viewed by the user (referred to as "target user" hereinafter), the tile ID (referred to as "target tile ID" hereinafter) indicating the currently viewing direction, the chunk number of the currently viewed chunk (referred to as "target chunk number" hereinafter) of the VR video and the like as well as the prediction chunk number from the client terminal 20, the viewing-direction prediction unit 11 records the viewing-direction information in the viewing-direction DB 13 (S101). Note that the processing procedure of FIG. 4 is repeatedly executed for each of the chunks of the target video.

Subsequently, the viewing-direction prediction unit 11 acquires, from the viewing-direction DB 13, a viewing-direction information group related to the target video ID among the viewing-direction information stored in the viewing-direction DB 13 (S102). The viewing-direction information regarding viewing of other users than the target user is also acquired herein.

Then, the viewing-direction prediction unit 11 predicts (estimates) the viewing direction of the target user at a timing (chunk) corresponding to the prediction chunk number based on the prediction chunk number received in step S101 and the past viewing-direction information group acquired in step S102 (S103). As a result of prediction of the viewing direction, viewing prediction information is generated. In the embodiment, the video is divided into four tiles, so that the viewing prediction information is the tile ID of one of the four tiles. Note that a prediction method of the viewing direction will be described later.

Subsequently, the viewing-direction prediction unit 11 transmits the viewing prediction information to the client terminal 20 (S104).

Then, upon receiving a request (video streaming request) with a designated chunk number from the client terminal 20, the video streaming unit 12 transmits the chunk related to the chunk number to the client terminal 20 (S105). In addition to the chunk number, the tile ID of the tile to be in a high image quality is also designated in the request. The video streaming unit 12 transmits the chunk where the designated tile is of a high image quality to the client terminal 20.

Figure 5:
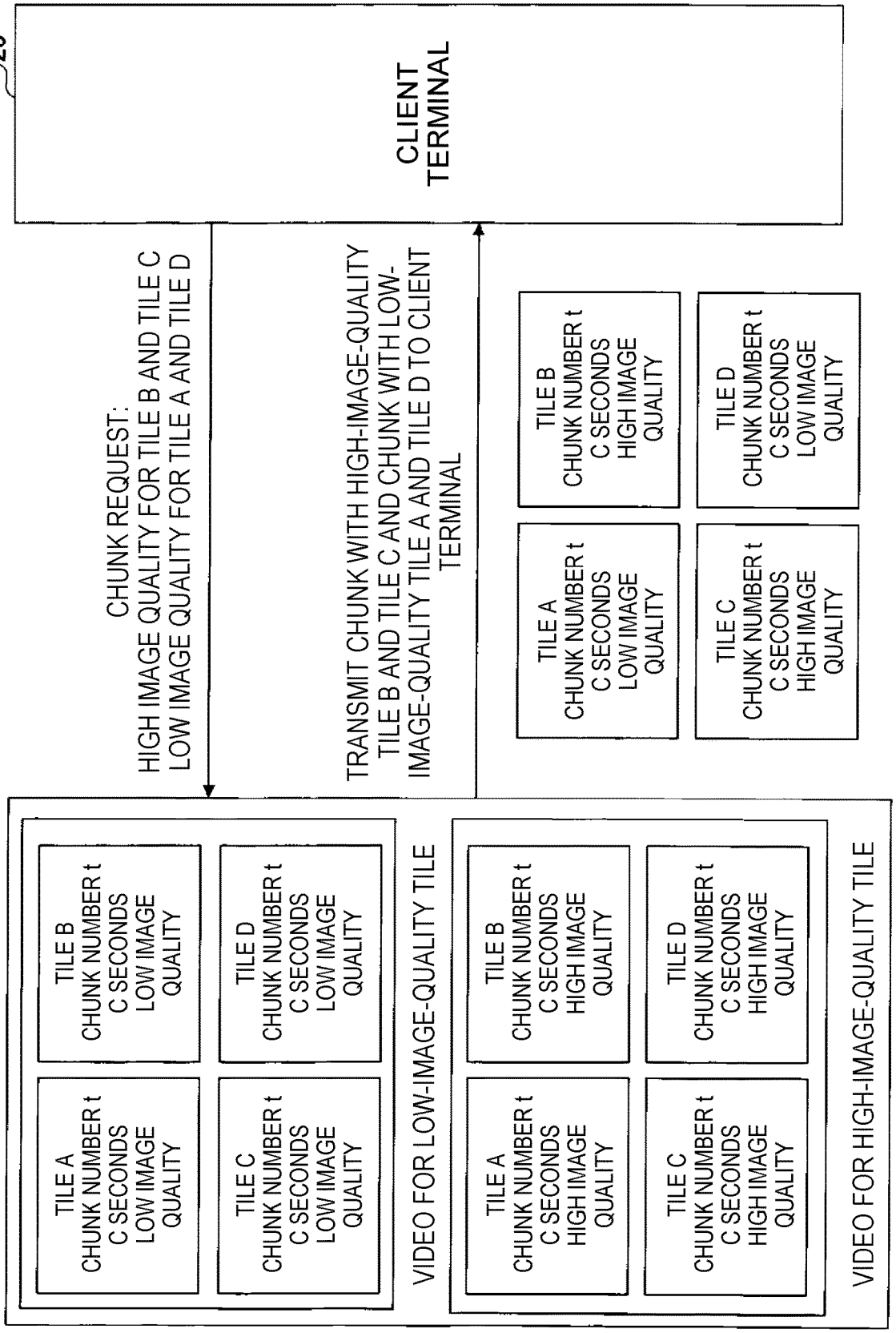
FIG. 5 is a chart for describing an example for distributing a chunk.

FIG. 5 is a chart for describing an example for distributing a chunk. The video streaming unit 12 holds high-image quality tiles and low-image quality tiles for each of the chunks of the tiled video divided and encoded by the encoding device 30. FIG. 5 illustrates a case as an example where the client terminal 20 requests to set the tiles B and C to be in a high image quality and, for the requested chunk, the video streaming unit 12 distributes a high-image quality tile for the tile B and the tile C and distributes a low-image quality tile for the tile A and the tile D to the client terminal 20. The client terminal 20 plays the transmitted tiles as a 360-degree VR video.

Next, details of the prediction method of the viewing direction according to the first embodiment will be described. In step S103, the viewing-direction prediction unit 11 processes the viewing-direction information group acquired in step S102 to a format illustrated in FIG. 6.

FIG. 6 is a chart illustrating an example of a process result of the viewing-direction information group according to the first embodiment. In FIG. 6, illustrated is the process result of the viewing-direction information group regarding a given VR video (a VR video related to the target video ID (referred to as "target video" hereinafter)). As illustrated in FIG. 6, in the first embodiment, the viewing-direction prediction unit 11 aggregates the number of views for each tile (each viewing direction) of each chunk of the target video based on the target tile ID and the target chunk number included in each viewing-direction information piece of the viewing-direction information group. That is, each numerical value in a table of FIG. 6 indicates the number of views of each tile of each chunk.

Among the process result illustrated in FIG. 6, the viewing-direction prediction unit 11 takes, as the viewing prediction information, the tile ID of the tile with the maximum number of views in a column corresponding to the prediction chunk number, that is, the tile that has been viewed most in the past in the chunk related to the prediction chunk number.

For example, when the prediction chunk number is "t", the tile of the largest number of views in the chunk number t in FIG. 6 is B, so that the tile ID of the tile B is the viewing prediction information. Similarly, when the chunk number "t−1" or the chunk number "t+1" is the prediction chunk number, the viewing prediction information is the tile ID of the tile A or the tile ID of the tile C, respectively.

For the chunk related to the prediction chunk number, the client terminal 20 requests, to the video streaming unit 12, a high-image-quality video (tile) for the currently viewing tile and the tile related to the tile ID indicated by the viewing prediction information and a low-image-quality video (tile) for the other tiles.

Figure 7:
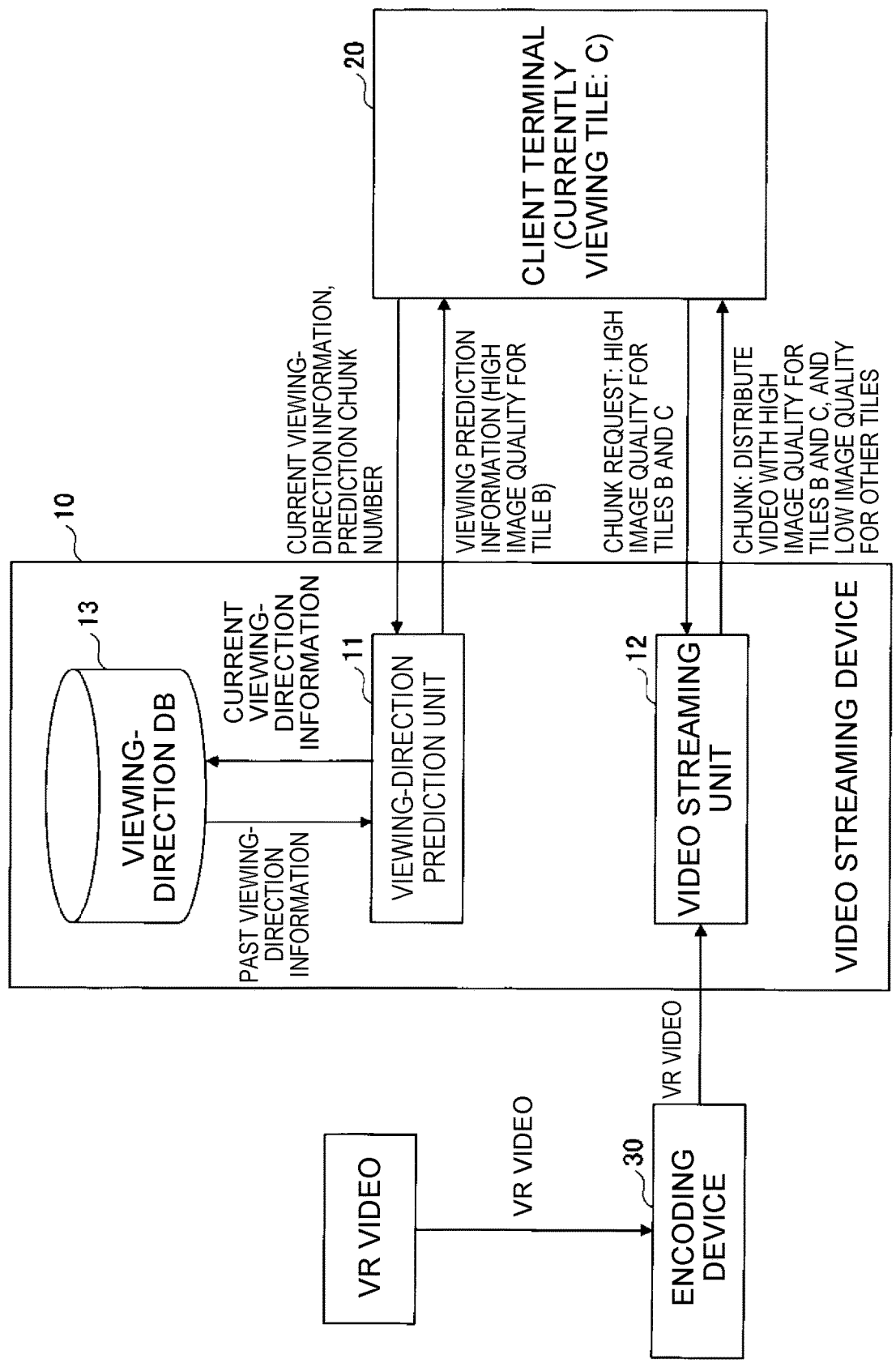
FIG. 7 is a chart illustrating a flow of distribution.

FIG. 7 illustrates a flow of distribution when the prediction chunk number is "t". The viewing prediction tile of the chunk number t is predicted as the tile B as described in FIG. 6, and the viewing prediction information indicating the tile ID of the tile B is transmitted to the client terminal 20 from the viewing-direction prediction unit 11. In FIG. 7, the tile currently viewed in the client terminal 20 is "C", so that the client terminal 20 requests the video streaming unit 12 to set the tile B and the tile C as the high-image-quality tiles. According to the request, the video streaming unit 12 distributes, to the client terminal 20, high-image-quality tiles for the tile B and the tile C and low-image-quality tiles for the other tiles for the chunk under the chunk number t.

As described above, according to the first embodiment, the tile to be the viewing target (viewing direction) is predicted for the chunk (undistributed chunk) that is after the currently viewed chunk based on the past record, and a high-image-quality video is distributed for the predicted tile. Therefore, even when the user changes the viewing direction, the probability of viewing a low-image-quality video can be decreased.

Furthermore, since the process information (information illustrated in FIG. 6) used for prediction in the first embodiment can be generated by aggregation of the histories of the viewing-direction information, the calculation cost required for generating the process information can be suppressed as well. As a result, it is possible to expect improvement in the quality of the experience felt by the user. Furthermore, by changing the number of high-image-quality tiles to be distributed based on the prediction, it is possible to expect the improvement in the quality in accordance with the bands and the distribution costs.

Next, a second embodiment will be described. In the second embodiment, different points with respect to the first embodiment will be described. Those that are not specifically mentioned in the second embodiment may be considered to be the same as those of the first embodiment.

In the second embodiment, the viewing-direction prediction unit 11 processes the viewing-direction information group not to the format illustrated in FIG. 6 but to the format illustrated in FIG. 8.

FIG. 8 is a chart illustrating an example of a process result of the viewing-direction information group according to the second embodiment. As illustrated in FIG. 8, in step S103 of the second embodiment, for each of the chunks of the target video, the viewing-direction prediction unit 11 aggregates the number of users who have viewed both tiles of a concerned combination for each combination of each tile of a concerned chunk and each tile of chunks after the concerned chunk in chronological order (N chunks after the concerned chunk). That is, each numerical value in FIG. 8 indicates the result of such aggregation. In FIG. 8, the vertical axis (row direction) corresponds to each of the tiles (A to D) of the chunk under the chunk number t, and the horizontal axis (column direction) corresponds to each of the tiles (A to D) of the chunk under the chunk number t+N.

In FIG. 8, it is indicated that, in a group of users viewing the tile B of the chunk number t, for example, the users who have viewed the tiles A, B, C, and D of the chunk number t+N are 5, 15, 5, and 10 users, respectively.

Note that "N" is a difference between the target chunk number and the prediction chunk number. For example, when the target chunk number is "t", the prediction chunk number is "t+N".

In the second embodiment, the viewing-direction prediction unit 11 applies the target chunk number and the target tile ID to the process result illustrated in FIG. 8 to predict the viewing direction in the chunk related to the target chunk number. Specifically, in the example of FIG. 8, when the target chunk number is "t" and the tile related to the target tile ID is "A", the viewing-direction prediction unit 11 takes the tile ID of the tile C as the viewing prediction information.

At the start of playing the target video, the viewing-direction prediction unit 11 may perform prediction by acquiring the chunk number at the start of the target video and the prediction chunk number from the client terminal 20.

Further, the client terminal 20 may transmit the prediction chunk number by each chunk or may transmit the prediction chunk numbers by every specific period of two chunks or more. In a case where the prediction chunk numbers are transmitted by every specific period of two chunks or more, the viewing-direction prediction unit 11 may perform prediction only when the prediction chunk numbers are transmitted. This may also be applied in the first embodiment.

Figure 9:
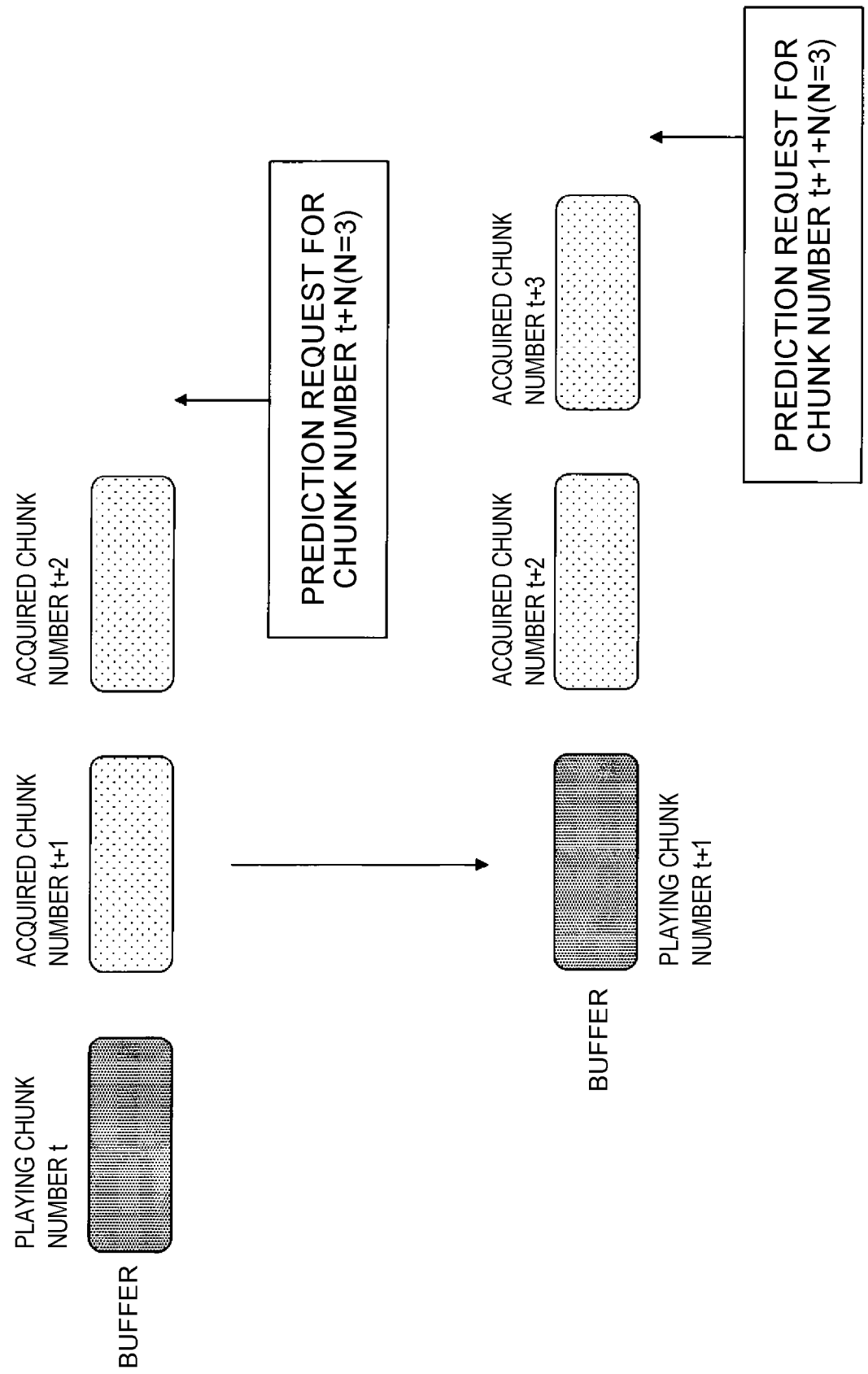
FIG. 9 is a schematic diagram of a buffer of a client terminal 20 according to the second embodiment.

When the client terminal 20 designates the next chunk number of the chunk held in the buffer as the prediction chunk number (that is, when N=buffer size of the client terminal 20), the content of the buffer of the client terminal 20 is as illustrated in FIG. 9.

FIG. 9 is a schematic diagram of the buffer of the client terminal 20 according to the second embodiment. FIG. 9 illustrates an example where the buffer size of the client terminal 20 is "3" (unit thereof is chunk). Therefore, the client terminal 20 can hold three chunks at the most.

In FIG. 9, the upper side indicates a state where the chunk number being played is "t". In this state, in the buffer of the client terminal 20, chunks of the respective chunk numbers "t", "t+1", and "t+2" are held. In this case, the client terminal 20 transmits the chunk number t+N (N=3) to the viewing-direction prediction unit 11 as the prediction chunk number.

Further, in FIG. 9, the lower side indicates a state where the chunk number being played is "t+1". In this state, in the buffer of the client terminal 20, chunks of the respective chunk numbers "t+1", "t+2", "t+3" are held. In this case, the client terminal 20 transmits the chunk number t+1+N(N=3) to the viewing-direction prediction unit 11 as the prediction chunk number.

Note that the viewing-direction prediction unit 11 may perform in advance the process illustrated in FIG. 8 not every time the prediction chunk number is received from the client terminal 20 but in a batch manner (that is asynchronously with reception of the prediction chunk number from the client terminal 20). Note, however, that the prediction chunk number is designated by the client terminal 20. That is, the difference (=N) between the target chunk number and the prediction chunk number is determined by the client terminal 20. Therefore, in a case where the process result is to be generated in advance, the viewing-direction prediction unit 11 may generate in advance the process result as illustrated in FIG. 8 for a plurality of kinds of N (=1, 2, . . . , n), and perform prediction by using the process result corresponding the difference between the target chunk number and the prediction chunk number transmitted from the client terminal 20.

As described above, according to the second embodiment, the viewing direction of after N chunks is predicted based on the tile the user is currently viewing, so that the prediction accuracy is expected to be improved compared to that of the first embodiment.

Next, a third embodiment will be described. In the third embodiment, different points with respect to the first embodiment will be described. Those that are not specifically mentioned in the third embodiment may be considered to be the same as those of the first embodiment.

In the third embodiment, the viewing-direction prediction unit 11 classifies each of past views of the VR video (or a group of past viewers of the VR video) into one of a plurality of classes based on the history of the viewing-direction information for each VR video at an arbitrary timing (for example, at a batch timing), and generates a prediction value of the viewing direction (tile ID) of each of the chunks by each of the classes of each VR video. Data including the viewing direction (tile ID) of each of the chunks by each of the classes of a given VR video is referred to as "class setting data" hereinafter.

Figure 10:
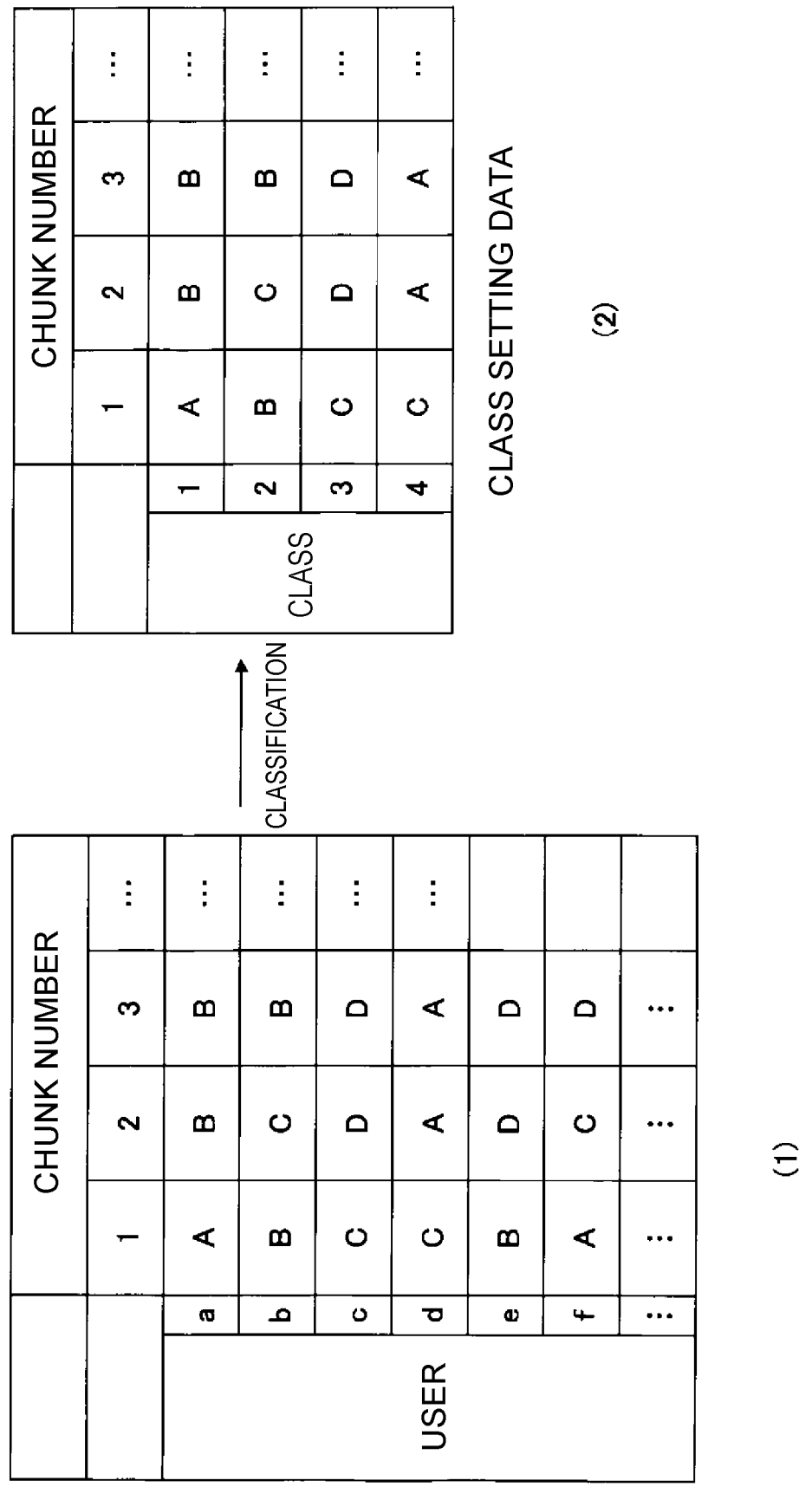
FIG. 10 is a chart for describing a class setting data according to a third embodiment.

FIG. 10 is a diagram for describing the class setting data according to the third embodiment. Illustrated in (1) of FIG. 10 is a viewing-direction information group acquired in step S102. In (1) of FIG. 10, only the user IDs of each viewing-direction information and the target tile IDs of each of the chunks included in the viewing-direction information group are illustrated for convenience. That is, (1) of FIG. 10 indicates the tile IDs of the viewing-target tiles for each of the users by each of the chunks with respect to a given VR video.

On the other hand, (2) of FIG. 3 illustrates class setting data. In the class setting data, the number of rows is aggregated to the number of classes. In (2) of FIG. 3, illustrated is an example where the number of classes=4.

Therefore, the class setting data includes the tile IDs for each of the chunks with respect to four classes from class 1 to class 4.

In step S103, the viewing-direction prediction unit 11 determines the class to which the target user belongs, and takes the tile ID recorded under the prediction chunk number for the class in the class setting data as the viewing prediction information.

As an example of classification, there will be described a method for deriving a direction feature amount and a motion feature amount by considering the characteristics of the viewing direction (direction characteristic and motion characteristic) for each of the user IDs. For example, in addition to the characteristic of the tile (direction) or tendency (direction characteristic) viewed by the user, such as the user mainly looking at the front or the user frequently looking at the back, feature amounts are defined to each of the characteristics of motions (motion characteristics) of each of the users, such as whether the user frequently changes the viewing direction or not. The users having such characteristics relatively close to each other are classified in a same class, and a history of the viewing directions of a single user (a given row of (1) in FIG. 8) of each of the classes is included in the class setting data as the representative value of the viewing directions of the class. For the calculation of the direction feature amount and the motion feature amount, Expression as follows is used, for example.

$$PFVx = \sum_{t=1}^{T} X(t)$$

$$PFVy = \sum_{t=1}^{T} Y(t)$$

[Math. 1]

Note here that "PFVx" and "PFVy" denote the direction feature amount in the x-axis and y-axis directions, respectively. Further, "T" denotes the value acquired by dividing the time length of the VR video content by a time length of the chunk, that is the number of chunks of the video. Note that "X(t)" denotes the position of the X coordinate of the tile under the chunk number t on the VR video content. "Y(t)" denotes the position of the Y coordinate of the tile under the chunk number t on the VR video content.

The motion feature amount MFV is calculated by Expression as follows as the total of the shift amounts in top-and-bottom and left-and-right tile shift for each of the chunk numbers, for example.

$$MFV = \sum_{x=1}^{T} |X(t+1) - X(t)| + |Y(t+1) - Y(t)|$$

[Math. 2]

The viewing-direction prediction unit 11 performs classification by setting a threshold value for one of "PFVx", "PFVy", and "MFV" or for those three. For example, in a case where two threshold values are set for each of the values and each of the values "PFVx", "PFVy", and "MFV" are classified into three classes, the total number of classes becomes "$3^3=27$". Note that (2) of FIG. 8 corresponds to a case where a single threshold value is set for each of "PFVx" and "PFVy", and each of the values of "PFVx" and "PFVy" are classified into two classes while classification of "MFV" is not performed. That is, the number of classes in this case is "2×2=4".

Thereby, each of the users (each of the user IDs) is classified into one of the classes.

After classifying the users, the viewing-direction prediction unit 11 extracts, for each of the classes, the history of the viewing direction of a single user within the class as the representative value, and defines the representative value as the prediction value of the viewing direction of the class. As a result, the prediction value of the viewing direction can be acquired for each of the classes. Note that the single user may be selected randomly.

As a classification method other than the one mentioned above, k-means clustering may be used instead of static threshold values. In that case, a mean value within the class may be used as the representative value.

For the currently viewing user (target user), the viewing-direction prediction unit 11 takes step S103 regarding the first M chunks as a classification phase, and calculates each of PFVx, PFVy, and MFV based on the viewing-direction information of the N chunks the target user has viewed.

Note that "M" is an arbitrary integer, which denotes the number of chunks used for classification. Since the classes are not determined in the first M−1 chunk, the viewing-direction prediction unit 11 does not transmit the viewing prediction information, while the client terminal 20 transmits a chunk request to the video streaming unit 12 to set only the currently viewing direction (tile related to the target tile ID) to be in a high image quality.

In step S103 of the M-th chunk or step S103 after the M-th chunk, the viewing-direction prediction unit 11 determines the class of the target user based on the viewing direction information of the M chunks (that is, part of the chunks of the target video the target user has viewed). The viewing-direction prediction unit 11 refers to the class setting data, and applies PFVx, PFVy, and MFV calculated for the target user to the threshold values of classification to classify the target user to one of the classes. With respect to the prediction value of the viewing direction of the class to which the target user is classified (referred to as "target class" hereinafter), the viewing-direction prediction unit 11 transmits the tile ID corresponding to the prediction chunk number to the client terminal 20 as the viewing prediction information. In step S103 at the timing where the target user is classified, the viewing-direction prediction unit 11 may generate the class setting data, and identify the viewing prediction information based on the class setting data.

The client terminal 20 transmits a chunk request to the video streaming unit 12 to set the tile of the viewing prediction information transmitted from the viewing-direction prediction unit 11 and the currently viewing direction to be in a high image quality.

While the example of classifying the target user according to the threshold values is described above, classification into the classes may be performed by another method.

Figure 11:
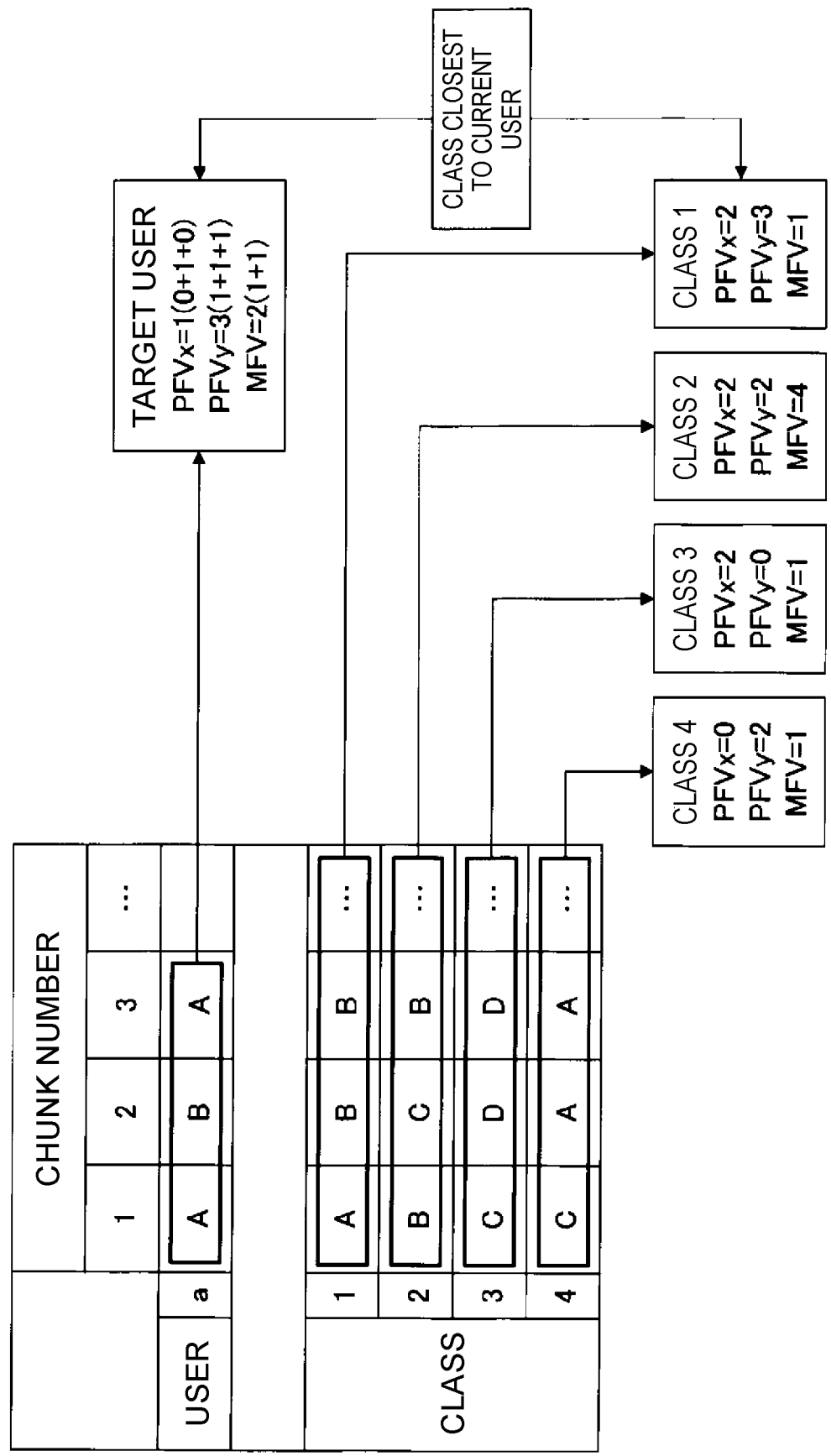
FIG. 11 is a chart for describing another example of classification into classes.

FIG. 11 is a diagram for describing another example of classification into classes. On the left side of FIG. 11, the history of the viewing direction of the target user (user a) is presented on the upper side while the prediction values (representative values) of the viewing direction of each of the chunks of the classes 1 to 4 are presented on the lower side. Note that it is assumed in FIG. 11 that M=3. That is, it is assumed that classification into classes is performed at the point where the target user has viewed up to three chunks.

In a case of the example of FIG. 11, the viewing-direction prediction unit 11 calculates PFVx, PFVy, and MFV based on the histories of the viewing directions of the three chunks of the target user. FIG. 11 illustrates the example where each thereof is calculated as follows.

PFVx=1(0+1+0)

PFVy=3(1+1+1)

MFV=2(1+1)

In the meantime, PFVx, PFVy, and MFV of each of the classes are calculated by using the prediction values of all chunks. It is assumed that the calculation results thereof are as written in FIG. 11.

For each of the classes, the viewing-direction prediction unit 11 calculates a difference between the value of the corresponding class and the value of the target user with respect to each of PFVx, PFVy, and MFV, and calculates the total value of the differences. The viewing-direction prediction unit 11 classifies the target user to the class having the smallest total value. In the example of FIG. 11, the class having the smallest total value is the class 1, so that the target user is classified into the class 1.

As described above, according to the third embodiment, it is possible to predict the optimal viewing direction for the users who make large motions and the users who do not by using the characteristic of viewing directions and the characteristic of motions of each of the users.

In the embodiment, the viewing-direction prediction unit 11 is an example of a prediction unit. The video streaming unit is an example of a streaming unit. The chunk is an example of a divided data piece. The chunk related to the prediction chunk number is an example of a first divided data piece.

While the embodiments of the present invention have been described above in detail, the present invention is not limited to any of such specific embodiments but various kinds of modifications and changes are possible without departing from the scope of the gist of the present invention described in the appended claims.

REFERENCE SIGNS LIST

10 Video streaming device
11 Viewing-direction prediction unit
12 Video streaming unit
13 Viewing-direction DB
20 Client terminal
30 Encoding device
100 Drive device
101 Recording medium
102 Auxiliary storage device
103 Memory device
104 CPU
105 Interface device
B Bus

The invention claimed is:

1. A video streaming device for distributing a video, wherein the video is defined by a plurality of data pieces with each data piece defining a respective segment of the video, the video streaming device comprising:
  a memory device storing a computer program; and
  a processor configured to execute the computer program to perform:
    obtaining current viewing information for a terminal playing the video, the current viewing information identifying (i) a first segment of the video that is currently being streamed by the terminal and (ii) a current viewing direction of a user of the terminal;
    obtaining past viewing information indicating, for each of a plurality of views of the video in the past, a respective viewing direction for each segment of the video;
    predicting a future viewing direction of the user of the terminal for a second segment of the video that is chronologically after the first segment, the predicting comprising:
      determining, from the past viewing information, for each respective viewing direction in a plurality of viewing directions, a respective number of viewers who have both (i) viewed the first segment in the current viewing direction and (ii) viewed the second segment in the respective viewing direction; and
      predicting the future viewing direction based on the respective numbers of viewers; and
    distributing the data piece for the second segment of the video to the terminal by setting an area corresponding to the predicted future viewing direction to be in a relatively high image quality among selectable image qualities.

2. The video streaming device according to claim 1, wherein the predicting comprises:
  classifying the plurality of views into a plurality of classes based on characteristics of the viewing directions and specifying the viewing direction for each of the plurality of divided data pieces by each of the classes; and
  predicting the viewing direction of the user based on a viewing direction that is specified for the class to which the user is classified based on a viewing direction of the user with respect to part of the divided data pieces already viewed by the user.

3. A video streaming method for distributing a video, wherein the video is defined by a plurality of data pieces with each data piece defining a respective segment of the video, the video streaming method comprising:
  obtaining current viewing information for a terminal playing the video, the current viewing information identifying (i) a first segment of the video that is currently being streamed by the terminal and (ii) a current viewing direction of a user of the terminal;
  obtaining past viewing information indicating, for each of a plurality of views of the video in the past, a respective viewing direction for each segment of the video;
  predicting a future viewing direction of the user of the terminal for a second segment of the video that is chronologically after the first segment, the predicting comprising:
    determining, from the past viewing information, for each respective viewing direction in a plurality of viewing directions, a respective number of viewers who have both (i) viewed the first segment in the current viewing direction and (ii) viewed the second segment in the respective viewing direction; and
    predicting the future viewing direction based on the respective numbers of viewers; and
  distributing the data piece for the second segment of the video to the terminal by setting an area corresponding to the predicted future viewing direction to be in a relatively high image quality among selectable image qualities.

4. A non-transitory computer-readable medium storing a program configured to cause a computer to perform operations for distributing a video, wherein the video is defined by a plurality of data pieces with each data piece defining a respective segment of the video, the operations comprising:

obtaining current viewing information for a terminal playing the video, the current viewing information identifying (i) a first segment of the video that is currently being streamed by the terminal and (ii) a current viewing direction of a user of the terminal;

obtaining past viewing information indicating, for each of a plurality of views of the video in the past, a respective viewing direction for each segment of the video;

predicting a future viewing direction of the user of the terminal for a second segment of the video that is chronologically after the first segment, the predicting comprising:

determining, from the past viewing information, for each respective viewing direction in a plurality of viewing directions, a respective number of viewers who have both (i) viewed the first segment in the current viewing direction and (ii) viewed the second segment in the respective viewing direction; and predicting the future viewing direction based on the respective numbers of viewers; and distributing the data piece for the second segment of the video to the terminal by setting an area corresponding to the predicted future viewing direction to be in a relatively high image quality among selectable image qualities.

* * * * *